United States Patent Office 3,136,813
Patented June 9, 1964

3,136,813
BORON-CARBORANE BONDED COMPOUNDS
James L. Boone and Robert J. Brotherton, Fullerton, Calif., assignors to United States Borax & Chemical Corporation, Los Angeles, Calif., a corporation of Nevada
No Drawing. Filed Sept. 21, 1961, Ser. No. 140,647
4 Claims. (Cl. 260—551)

The present invention relates as indicated to boron-carborane bonded compounds and has more particular reference to a new class of compounds, the diaminocarboranylboranes, and to a method for preparing the same.

The diaminocarboranylboranes of the present invention are thermally stable derivatives of carborane ($B_{10}H_{12}C_2$). Due to their high boron and low carbon content they are high-energy compounds and will be found to be particularly useful as components of high-energy propellants. Additionally they have important uses as precursors of high-energy polymeric materials having high boron and low carbon contents, which polymeric materials will be found useful in high-energy solid propellant systems.

It is, therefore, the principal object of this invention to provide as new compositions of matter the diaminocarboranylboranes.

It is a further object of the present invention to provide a method for preparing the diaminocarboranylboranes.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises as new compositions of matter the diaminocarboranylboranes having the formula

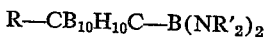

where R is selected from the group consisting of hydrogen, alkyls of from 1 to 6 carbon atoms and phenyl, and R' is selected from the group consisting of alkyls of from 1 to 6 carbon atoms and phenyl.

The preparation of the diaminocarboranylboranes of the present invention can best be illustrated by the following equation:

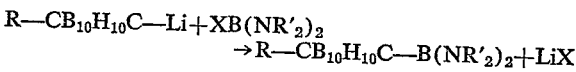

where $R-CB_{10}H_{10}C-Li$ is a monolithiocarboranyl compound, $XB(NR'_2)_2$ is a diaminohaloborane, X is either chlorine or bromine, R is either hydrogen, an alkyl of from 1 to 6 carbon atoms, or phenyl, and R' is either an alkyl of from 1 to 6 carbon atoms or phenyl.

The preferred method for performing the above reaction is to add the monolithiocarboranyl compound to the diaminohaloborane with agitation at a temperature of less than about 20° C., under an inert atmosphere. The resultant reaction mass is allowed to warm to about ambient temperature with continued agitation, and the solid precipitate formed is removed from the reaction mass by filtration. Removal of the volatile materials from the residual solution by distillation at reduced pressure then yields the desired diaminocarboranylborane.

The monolithiocarboranyl compounds applicable as reactants in the present process, and means for their preparation are known in the art. The following list is illustrative of the monolithiocarboranyl compounds applicable to the present invention:

11-lithio carborane
11-lithio-12-methyl carborane
11-lithio-12-ethyl carborane
11-lithio-12-isopropyl carborane
1-lithio-12-n-butyl carborane
11-lithio-12-sec-amyl carborane
11-lithio-12-phenyl carborane Referring to the diaminohaloboranes, it will be noted that the amino groups of the diaminohaloboranes which are applicable to the present process are derived from the corresponding secondary amines. In the preferred embodiment of the invention we use the diaminohaloboranes where the halogen substituent is chlorine.

The following list is illustrative of the diaminohaloboranes which are applicable to the present invention:

chlorobis(dimethylamino)borane
bromobis(dimethylamino)borane
chlorobis(diethylamino)borane
bromobis(di-n-propylamino)borane
chlorobis(diisobutylamino)borane
bromobis(di-n-hexylamino)borane
chlorobis(diphenylamino)borane It is to be clearly understood that the foregoing lists are only a partial enumeration of the diaminohaloboranes and the monolithiocarboranyl compounds applicable to the present invention and are not intended to limit the invention.

So that the present invention is more clearly understood, the following examples are given for illustrative purposes:

I

A solution of 8.42 grams (0.056 mole) of 11-lithio carborane in 50 ml. of diethyl ether and 20 ml. of n-heptane was slowly added with constant agitation to a solution of 7.56 grams (0.056 mole) of chlorobis(dimethylamino)-borane in 75 ml. of diethyl ether at 0° C. in a nitrogen atmosphere. Agitation was continued and after about 3 hours the reaction mass was allowed to warm to room temperature. The solid precipitate which had formed was removed from the reaction mass by filtration, and chemical analysis of the precipitate showed it to be lithium chloride. The volatile materials were removed from the filtrate by vacuum distillation at room temperature and a viscous melt which slowly crystallized at room temperature was recovered. The recovered materials were dissolved and recrystallized from an ether-pentane solution, and 6.1 grams (44.9% yield) of bis(dimethylamino)-carboranylborane was obtained. Chemical analysis of the product yielded the following data:

Calculated for $H-CB_{10}H_{10}C-B[N(CH_3)_2]_2$: B=49.12%; H=9.57%; N=11.57%. Found in product: B=48.72%; H=9.53%; N=11.54%.

II

The reaction was performed as described in Example I, except bromobis(dimethylamino)borane was used instead of chlorobis(dimethylamino)borane and toluene was substituted for the diethyl ether. The product recovered was identical to that of Example I.

III

A solution of 14.03 grams (0.062 mole) of 11-lithio-12-phenyl carborane in 100 ml. of diethyl ether and 22 ml. of n-heptane was slowly added with constant agitation to a solution of 11.81 grams (0.062 mole) of chlorobis(diethylamino)borane in 100 ml. of diethyl ether at 0° C. in a nitrogen atmosphere. Agitation was continued and after about 4 hours the reaction mass was allowed to warm to about room temperature. The solid precipitate which had formed was removed from the reaction mass by filtration, and chemical analysis of the precipitate showed it to be lithium chloride. The volatile materials were removed from the filtrate by vacuum distillation at room temperature and a viscous liquid which slowly crystallized at room temperature was recovered. The recovered crystals were dissolved and recrystallized from an ether-pentane solution and 10.98 grams (47.3% yield) of bis(diethylamino)phenylcarboranylborane was obtained. Chemical analysis of the product yielded the following data:

Calculated for $C_6H_5 - CB_{10}H_{10}C - B[N(C_2H_5)_2]_2$: B=31.78%; H=9.42%; N=7.48%. Found in product: B=31.42%; H=9.39%; N=7.47%.

Other modes of applying the principle of the invention may be employed, change being made as regards the details described, provided the features stated in any of the following claims or the equivalent of such be employed.

We, therefore, particularly point out and distinctly claim as our invention:

1. The diaminocarboranylboranes having the formula $$R - CB_{10}H_{10}C - B(NR'_2)_2$$

where R is selected from the group consisting of hydrogen, alkyls of from 1 to 6 carbon atoms and phenyl and R' is selected from the group consisting of alkyls of from 1 to 6 carbon atoms and phenyl.

2. Bis(dimethylamino)carboranylborane.

3. Bis(diethylamino)phenylcarboranylborane.

4. The method for preparing diaminocarboranylboranes having the formula $$R - CB_{10}H_{10}C - B(NR'_2)_2$$

which comprises adding a monolithiocarboranyl compound having the formula $R - CB_{10}H_{10}C - Li$ to a diaminohaloborane having the formula $XB(NR'_2)_2$ with constant agitation, at a temperature less than about 20° C., in an inert atmosphere, allowing the resultant reaction mass to warm to about ambient temperature, removing the solid precipitate formed from said reaction mass, and recovering the desired diaminocarboranylborane from the resultant solution, where R is selected from the group consisting of hydrogen, alkyls of from 1 to 6 carbon atoms and phenyl, R' is selected from the group consisting of alkyls of from 1 to 6 carbon atoms and phenyl, and X is a halogen selected from the group consisting of chlorine and bromine.

No references cited.